United States Patent
Hübler et al.

(10) Patent No.: US 7,358,450 B2
(45) Date of Patent: Apr. 15, 2008

(54) METHOD FOR WEIGHING ITEMS MOVING OVER A WEIGHING PLATE IN SUCCESSION

(75) Inventors: Uwe Hübler, Neunenhagen (DE); Christoph Kunde, Berlin (DE); Michael Schmidt-Kretschmer, Oranienburg (DE)

(73) Assignee: Francotyp-Postalia GmbH (DE)

( * ) Notice: Subject to any disclaimer, the term of this patent is extended or adjusted under 35 U.S.C. 154(b) by 18 days.

(21) Appl. No.: 11/268,380

(22) Filed: Nov. 7, 2005

(65) Prior Publication Data

US 2006/0122950 A1 Jun. 8, 2006

(30) Foreign Application Priority Data

Nov. 15, 2004 (DE) .................. 10 2004 054999

(51) Int. Cl.
*G01G 19/414* (2006.01)

(52) U.S. Cl. .................. 177/25.15; 177/121; 705/407
(58) Field of Classification Search ............. 177/25.15, 177/119–121; 705/407, 414
See application file for complete search history.

(56) References Cited

U.S. PATENT DOCUMENTS

| | | | |
|---|---|---|---|
| 4,709,770 A * | 12/1987 | Kohashi et al. ................ | 177/50 |
| 4,956,782 A | 9/1990 | Freeman et al. | |
| 5,635,679 A * | 6/1997 | Kohashi et al. .......... | 177/25.13 |
| 6,098,057 A * | 8/2000 | Dlugos ........................ | 705/407 |
| 6,178,410 B1 | 1/2001 | Kunde et al. | |
| 6,265,675 B1 | 7/2001 | Hübler et al. | |
| 6,364,306 B1 | 4/2002 | Kunde et al. | |
| 6,559,391 B2 * | 5/2003 | Huebler et al. .......... | 177/25.15 |
| 6,630,632 B2 * | 10/2003 | Huebler et al. ................ | 177/4 |
| 6,635,830 B2 * | 10/2003 | Ring ........................ | 177/25.13 |
| 6,759,602 B2 * | 7/2004 | Miller et al. ............. | 177/25.15 |
| 6,825,423 B2 * | 11/2004 | Eaton et al. ................... | 177/1 |
| 6,907,409 B1 | 6/2005 | Huebler | |
| 6,947,912 B1 | 9/2005 | Huebler et al. | |
| 2002/0040260 A1 | 4/2002 | Huebler et al. | |

FOREIGN PATENT DOCUMENTS

DE 27 17 721 10/1978

OTHER PUBLICATIONS

"Calculus with Analytic Geometry", Mustafa Munem, et al., Worth Publishers, Inc, © 1978, pp. 85-90, 98-104, & 311-316.*

* cited by examiner

*Primary Examiner*—Randy W Gibson
(74) *Attorney, Agent, or Firm*—Schiff Hardin LLP

(57) ABSTRACT

In a method for weighing a number of items, such as letters to be franked, on a transport belt that moves over a weighing plate, the base of which is formed by the transport belt, the transport speed of the belt is slowed within a measurement time range, that starts from the beginning of a weighing event on the weighing plate until a stable weight measurement occurs, and is accelerated outside of this measurement time range, after the occurrence of a stable weight value for a current item on the weighing plate, the next-following item is transported onto the weighing plate by the belt, and the weight of the next-following item is determined by the weight increase due to inflow of the next-following item and the weight decrease due to outflow of the current item.

11 Claims, 11 Drawing Sheets

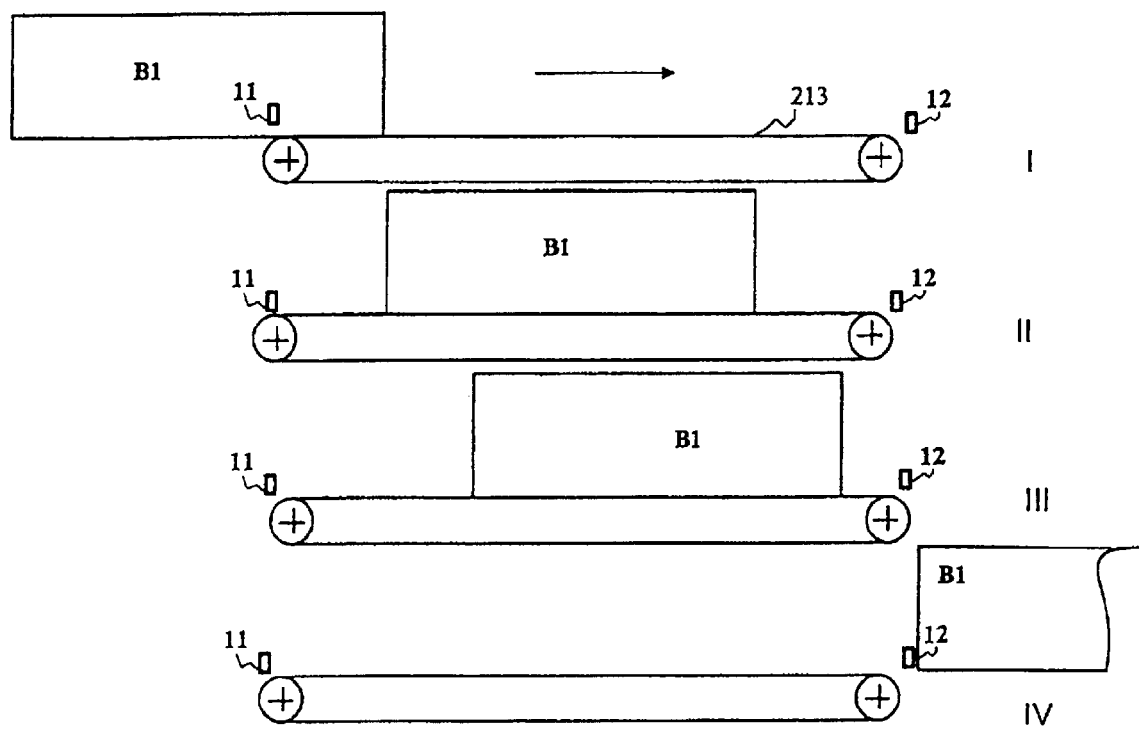
Fig. 2a1
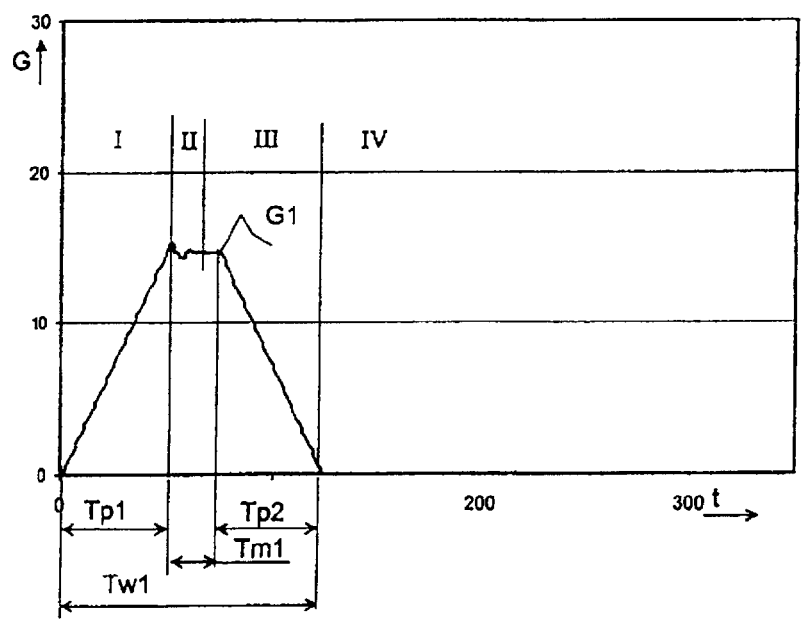
Fig. 2a2

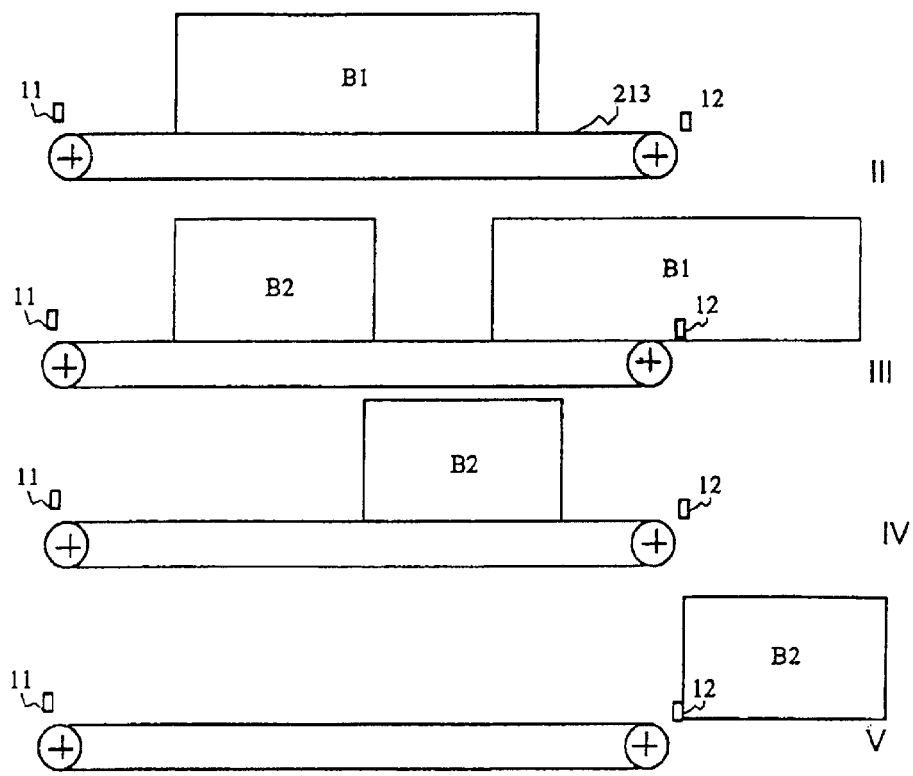
Fig. 2b1
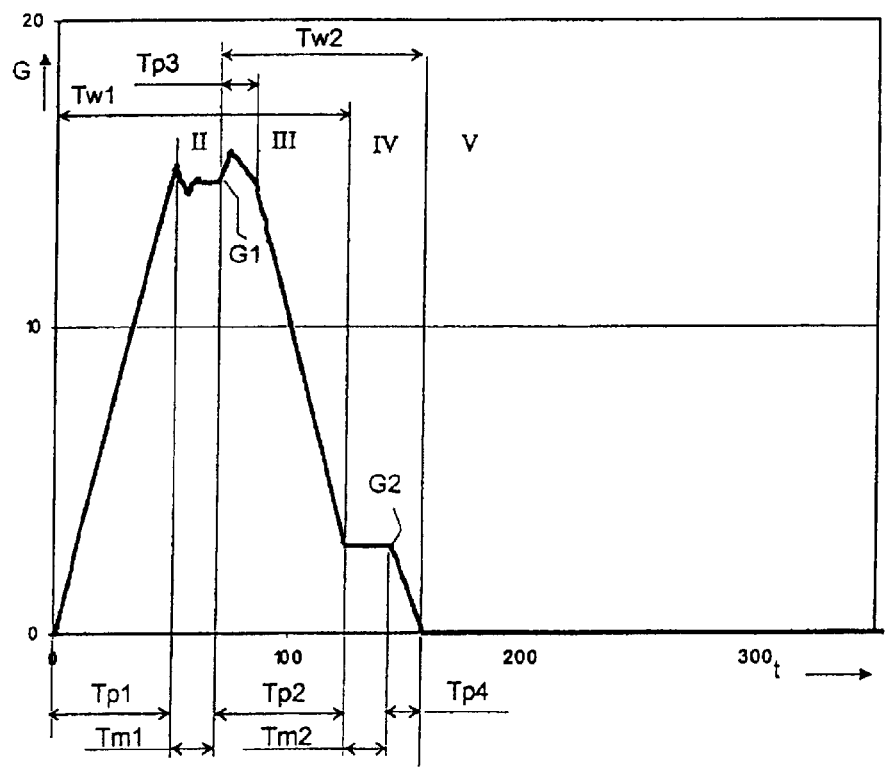
Fig. 2b2

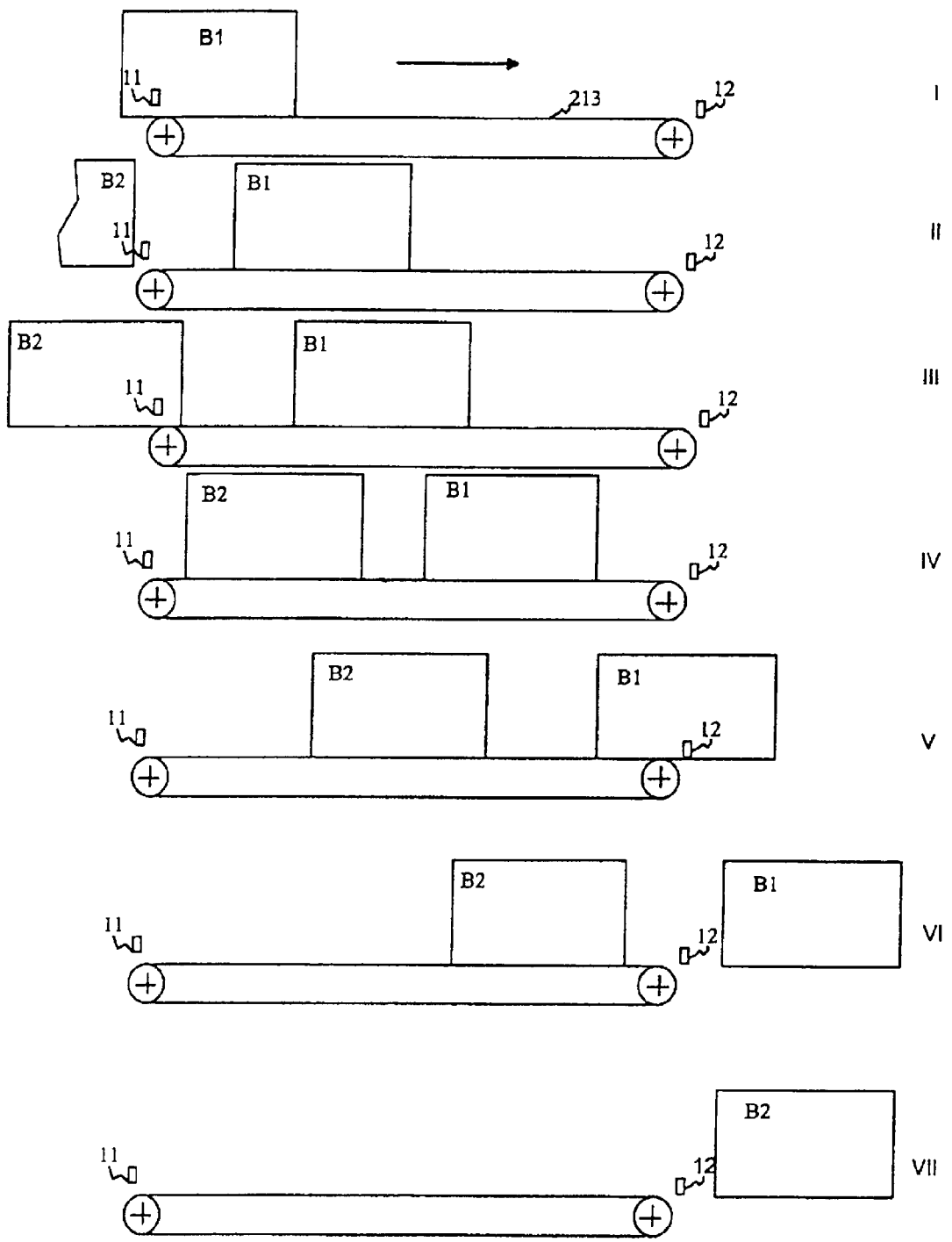
Fig. 2c1

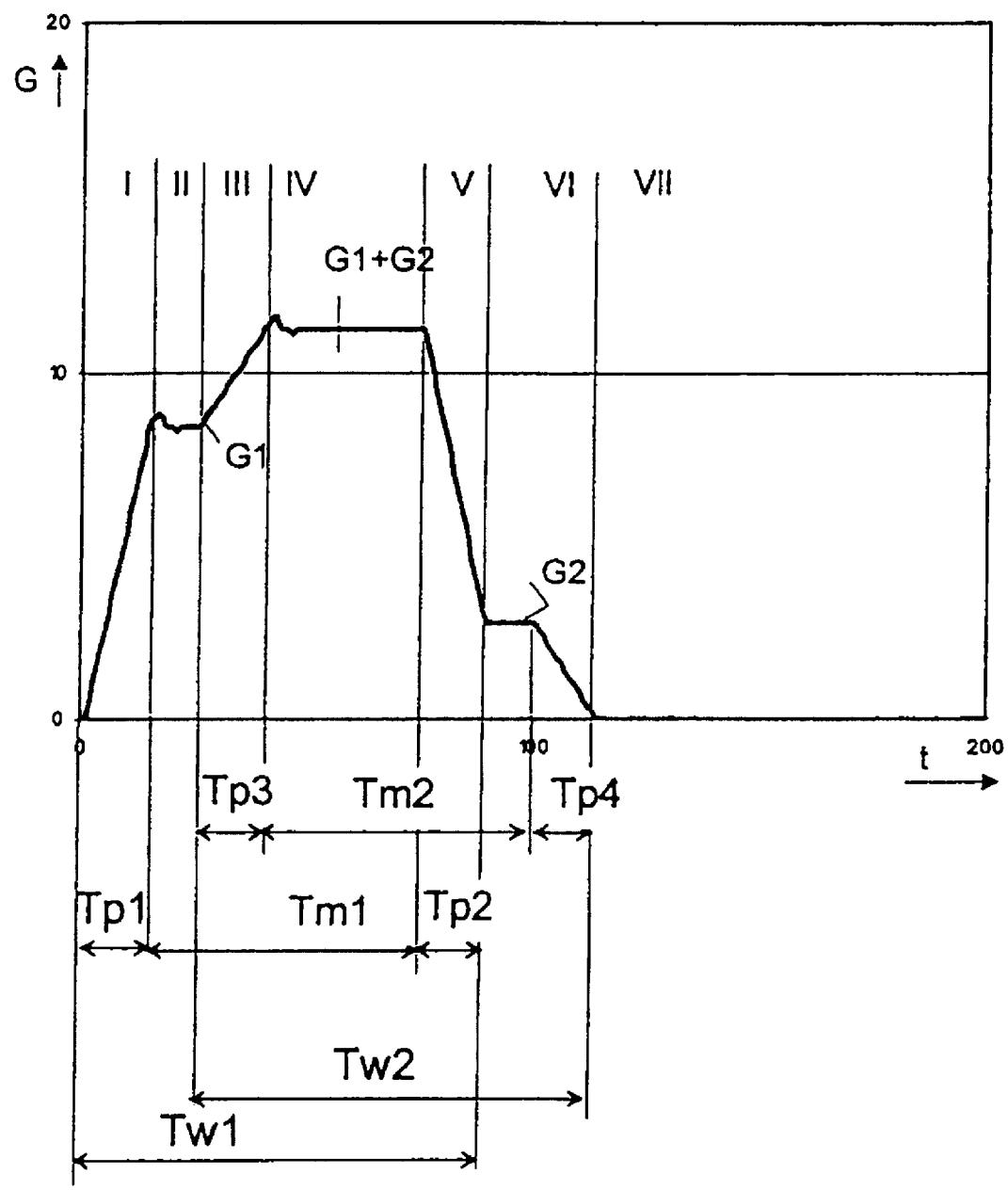
Fig. 2c2

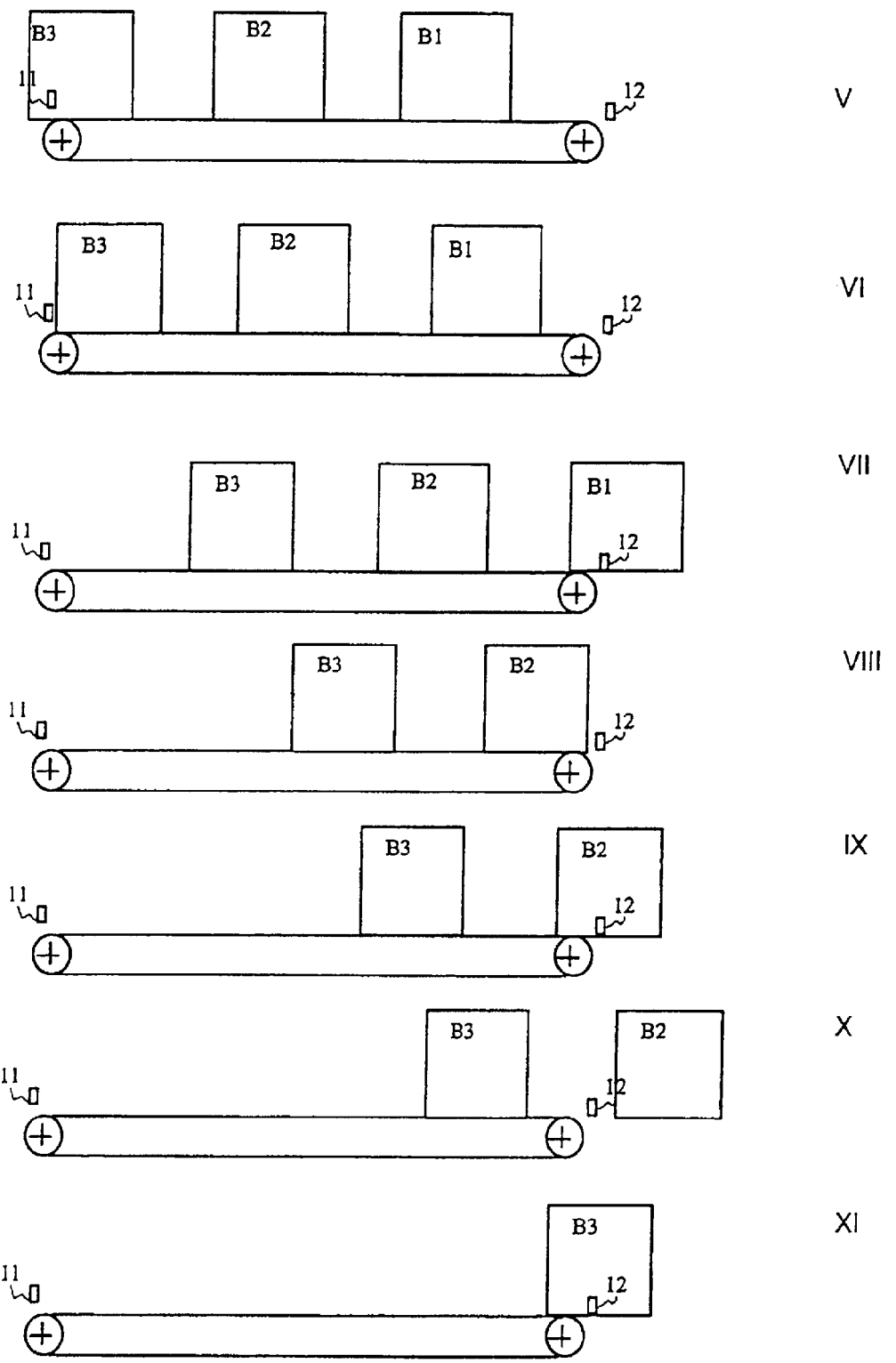
Fig. 2d1

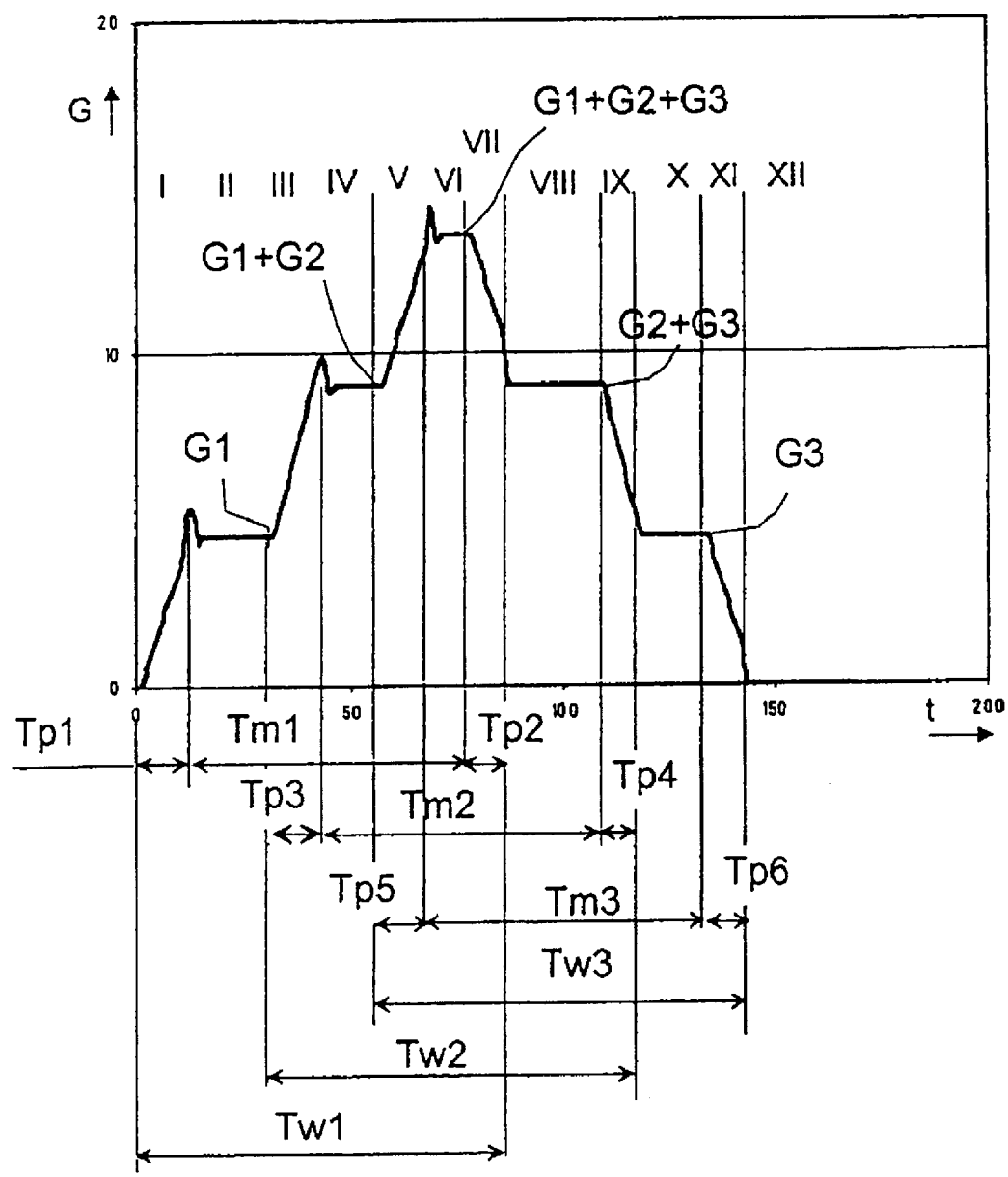
Fig. 2d2

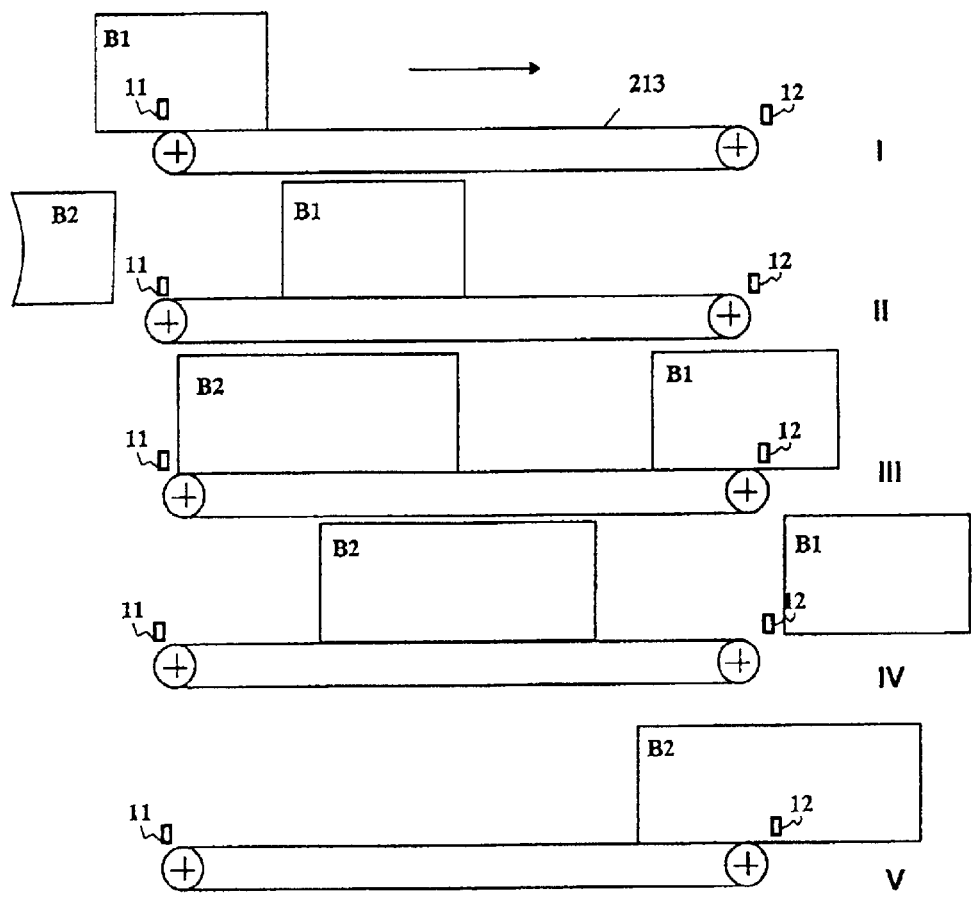
Fig. 2e1
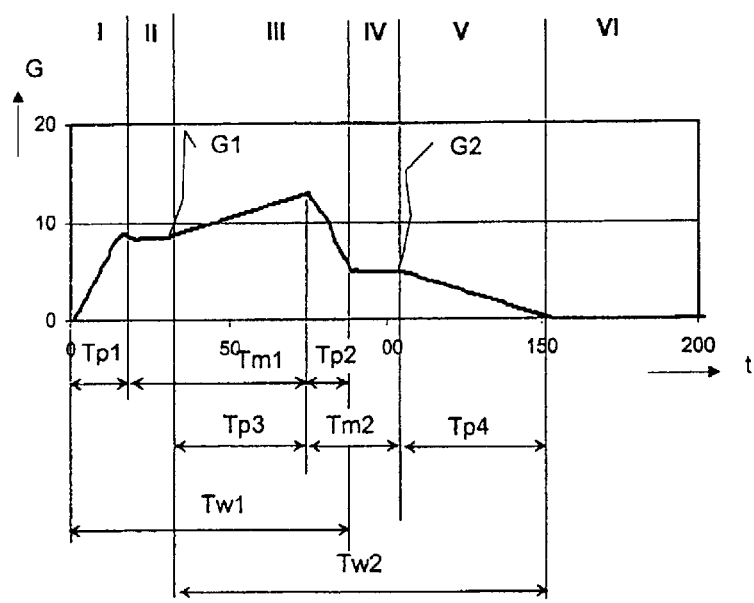
Fig. 2e2

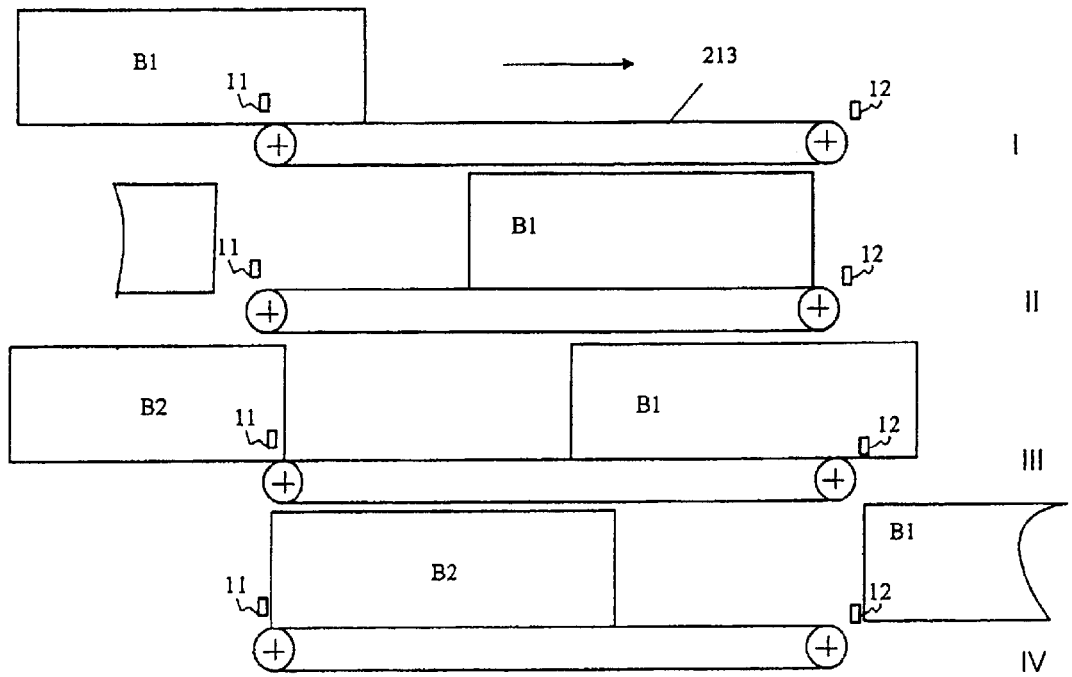
Fig. 2f1
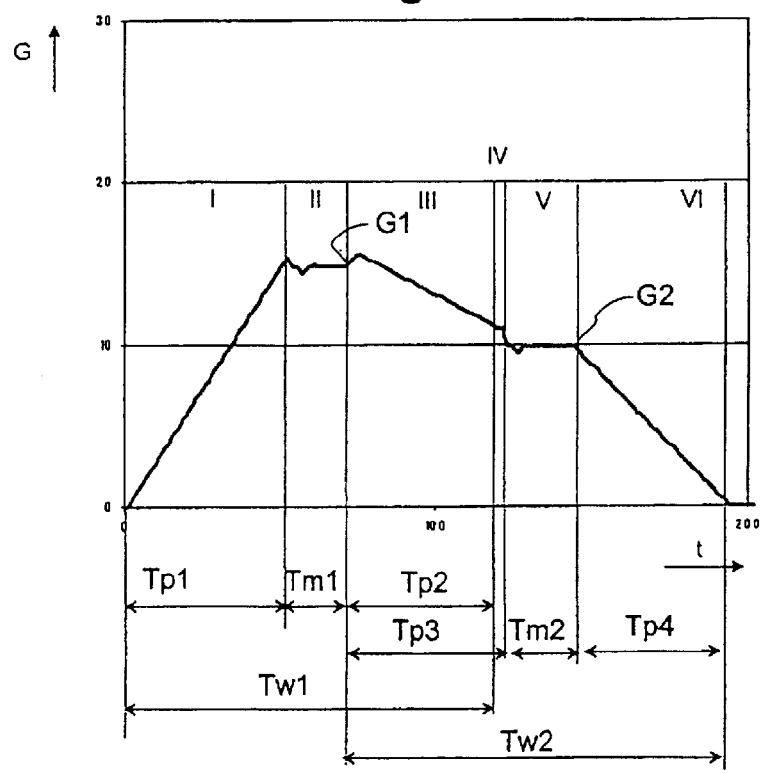
Fig. 2f2

METHOD FOR WEIGHING ITEMS MOVING OVER A WEIGHING PLATE IN SUCCESSION

BACKGROUND OF THE INVENTION

1. Field of the Invention

The invention concerns a method for weighing items moving over a weighing plate in succession, particularly letters standing on edge. The method is suitable for users of mail processing systems with a dynamic scale and a postage-calculating franking machine, or with a dynamic postage calculation scale and a franking machines.

2. Description of the Prior Art

Mail processing systems typically include a mail item sorting (separating) device (see DE 27 17 721 A1 and DE 37 31 525 C2).

Such mail processing systems normally are described for mixed mail. This means a load range of 3 to 1000 grams, a load thickness between 0.5 and 20 millimeters and load lengths between 100 and 353 millimeters.

A letter sorting device is known (see DE 199 12 807 A1) that is equipped with means for determination of the letter dimensions. The data so determined are conducted to a following device such as a scale and/or franking machine (see also EP 1 189 041 A1).

In modern mail handling systems the scale is designed as a dynamic scale, to achieve faster throughput, as described, for example, in DE 198 33 767 C2 and EP 0 974 819 A2. The scale has a weighing plate with the base thereof formed by the transport belt of a transport device. The weighing plate has a rear wall for guidance of the mail item. The mail item is weighed during the transport. The weighing plate is executed with a lightweight construction such that it is bending-resistant and distortion-resistant and is coupled to a weighing cell at the approximate location of the center of gravity of the combination of the weighing plate and a mail item with the maximum allowable weight and the largest allowable dimensions arranged centrally on the weighing plate. The weighing cell is provided so that the maximal travel (excursion) is in the micrometer range. The length of the weighing plate is correspondingly adapted to the largest mail item length to be processed. This means that the distance between a long mail item and the next following mail item is at least equal to the weighing plate length plus the length for the necessary measurement time.

An arrangement for communication between stations of a mail processing machine is known (see EP 0 875 864 A2, in particular FIGS. 2b and 3b) in which a dynamic scale is connected according to the interface via data cables with each of a preceding automatic feed and a following franking machine. In detail, the scale has a controller, emergency stop logic, two interfaces and associated connection contact means. Inside the scale, the controller is connected with the emergency stop logic.

Furthermore, a method and an arrangement for determination of a weight with a dynamic scale are known from EP 1 014 052 A1. The arrangement has a transport device, a weighing plate, a weighing cell, sensors for the mail item intake and discharge as well as an electronic control unit. The control unit serves for control of the transport device as well as for evaluation of the measurement values transmitted by the weighing cell, for measurement value correction using determined parameters, and for output of a corrected weight value to a franking machine via an interface. According to the associated method, selection of a mid-range measurement value ensues for comparison with at least one overload limit value for testing to insure the absence of an overload condition and a decision parameter is formed for comparison with at least one deactivation criterion with regard for testing the validity of the measurement values transmitted from the weighing cell. In this method, the measuring time begins when the trailing edge of the postal item passes the input sensor, and the measurement time ends when the trailing edge passes the output sensor.

A method for controlling a dynamic scale is known (see EP 1 014 050 A1) that can process mixed mail items with different sizes and thicknesses and that can be operated in at least two operating modes, the mail items subsequently passing through a further processing station. In a manner analogous to the solution cited above, a transport belt driven by a motor, the transport belt simultaneously forming the floor of the weighing plate, serves for transport of the mail items. A controller for rotation speed regulation is provided for the motor. In a dynamic operating mode, when a mail piece is located in the intake of the scale, independent of its format the mail piece is conveyed with a transport speed (set with a default value) before the beginning of a first measurement time range.

In the first measurement time range, the rotation speed regulation by the controller of the scale is deactivated and an unregulated pulse voltage is applied to the direct current motor so that a dynamic weight measurement ensues with deactivated rotation speed regulation. In the first measurement time range, the transport speed is varied dependent on the weight of the mail piece by interaction of the direct current motor with a tension device for a defined setting of the belt tension of the transport belt, and with a vibration-damped design of the transport device of the scale. Thus in the case of dynamic weighing, heavy mail pieces are automatically transported slower and consequently the available measurement time is increased. The evaluation of the measurements ensues in the controller of the scale and requires a calculation time and a reaction time. The leading edge of the mail piece exits the weighing plate after the measurement time has elapsed. If after the elapse of the measurement time, an algorithm for error detection detects an error, the scale is automatically switched by the controller into a reweighing mode. The largest format to be processed is taken into account in the selected measurements of the weighing plate. The selected transport speed of the belt corresponds to the transport speed in the subsequent franking machine, but the set intervals from mail piece-to-mail piece reduce the cycle capacity of the scale to approximately two-thirds of the maximum cycle capacity of the franking machine. Experience has shown that, under these conditions, a re-measurement (requiring transport interruption and return movement of the mail piece) is seldom necessary.

When a mail piece is located in the exit region outlet of the scale, activation of the rotation speed regulation ensues again for the motor.

After the weighed mail piece has exited the scale, the subsequent mail piece is conducted onto the weighing plate. This means that the minimum separation between two successive mail pieces amounts to more than one weighing plate length; that is particularly disadvantageous in the case of short, light letters. However, significantly smaller separations between the mail pieces are allowed for the mail item processing in the franking machine.

SUMMARY OF THE INVENTION

An object of the invention is to better utilize existing capabilities of mail processing components to increase the throughput of mail items through a processing system.

More specifically, an object of the invention is to achieve smaller intervals between the mail pieces without increasing the transport speed in the scale region relative to the transport speed in a subsequent (downstream) device.

The invention proceeds from the previously unrecognized fact that the necessary measurement time is always shorter than the retention time of the mail piece on the weighing plate. The difference is particularly large in the case of short, light letters since here the settling time for the scale is also correspondingly short.

In accordance with the invention, the subsequent (next) mail piece is already conducted to the weighing plate after a stable measurement result exists for the last-weighted (i.e. the immediately preceeding) mail piece. The weight of the subsequent mail piece is determined by calculation addition (mail piece in addition to the weighing plate) or by subtraction (a mail piece leaves the weighing plate). If the mail pieces are letters, under the assumptions of the smallest possible separations between the letters and the shortest-allowed and light letters (synonymous with the shortest measurement time) multiple letters can be simultaneously on the weighing plate. Generally, two letters can be simultaneously on the weighing plate. This corresponds to an increase of the throughput by at least double relative to the conventional prior art. The smallest-possible interval between two letters is between 20 to 50% of the shortest letter length and is established by the conditions in the sorting. The increase of the throughput in turn enlarges the tolerance for adaptation to the processing speed of the upstream and downstream components of the mail processing system.

DESCRIPTION OF THE DRAWINGS

FIGS. 2a1 and 2a2 schematically illustrate letter movement relative to the weighing plate, with an associated time diagram, for weighing an individual long letter in accordance with the invention.

FIGS. 2b1 and 2b2 schematically illustrate letter movement relative to the weighing plate, with an associated time diagram, for weighing a short letter after a long letter in accordance with the invention.

FIGS. 2c1 and 2c2 schematically illustrate letter movement relative to the weighing plate, with an associated time diagram, for weighing a short letter after a short letter in accordance with the invention.

FIGS. 2d1 and 2d2 schematically illustrate letter movement relative to the weighing plate, with an associated time diagram, for weighing three short letter in succession in accordance with the invention.

FIGS. 2e1 and 2e2 schematically illustrate letter movement relative to the weighing plate, with an associated time diagram, for weighing a long letter after a short letter in accordance with the invention.

FIGS. 2f1 and 2f2 schematically illustrate letter movement relative to the weighing plate, with an associated time diagram, for weighing a long letter after a long letter in accordance with the invention.

DESCRIPTION OF THE PREFFERED EMBODIMENTS

The representation below is partially schematized for simplification and for easier understanding. For brevity, in the following the term "letter" is used to represent all types of mail goods or mail items capable of being weighed in the manner described below.

Figure 1:
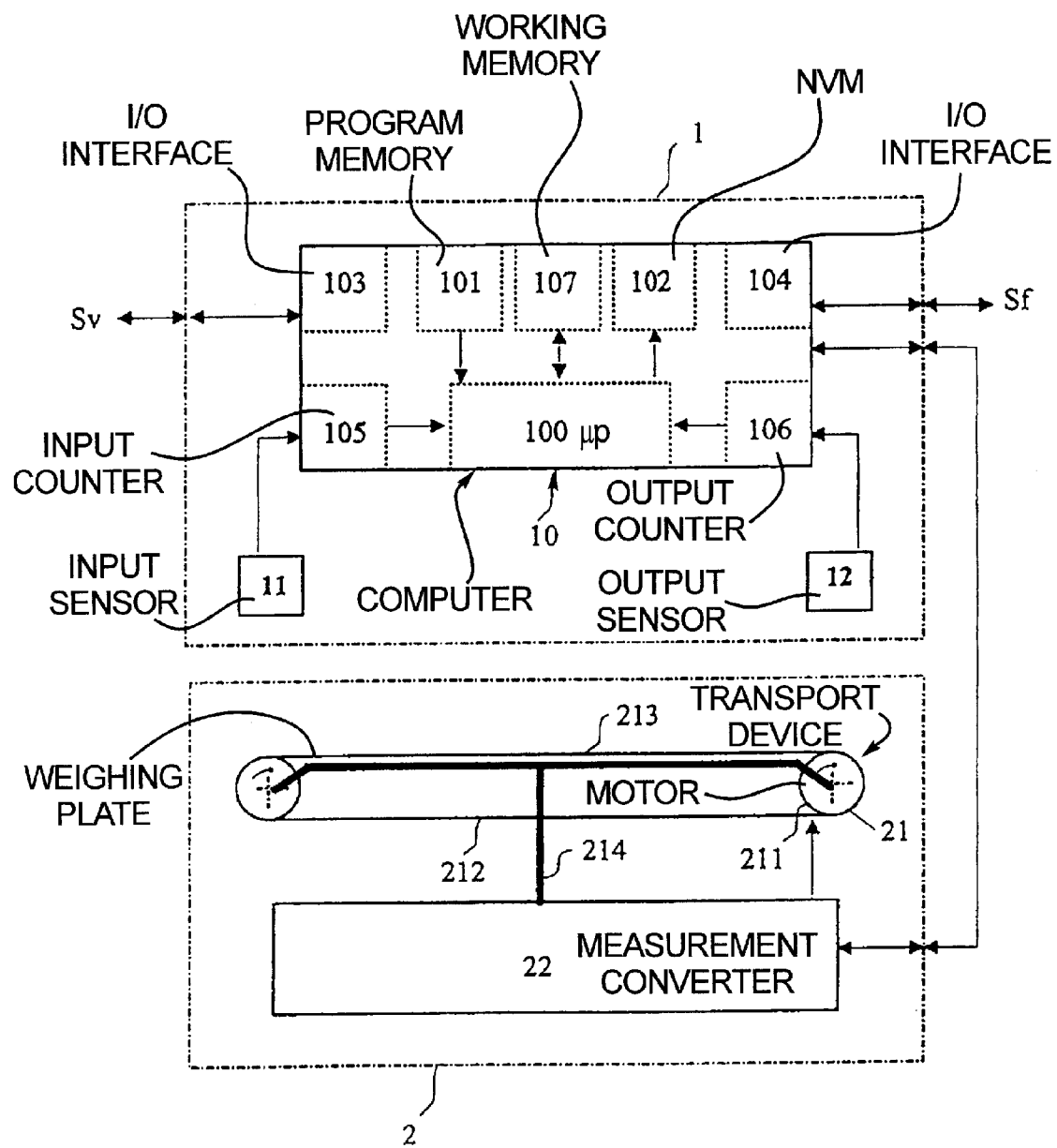
FIG. 1 is a block diagram of a dynamic scale constructed and operating in accordance with the invention.

As shown in FIG. 1, a dynamic scale for implementation of the inventive method is basically composed of a control part 1 and a transport and weighing part 2.

The control part 1 includes a computer 10 with a microprocessor (μp) 100, a program memory 101 for the operating software, a non-volatile memory (NVM) 102 for operating data such as transport speed or measurement precision, a working memory 107 executed as a RAM, an input/output interface 103 on the input side, an input/output interface 104 on the output side, an input counter 105 for incoming letters B, an output counter 106 for outgoing letters B, an input sensor 11 and an output sensor 12.

The input/output interface 103 on the input side is connected with a sorting device via a bidirectional data line for exchange of signals Sv. These can be, for example, signals as to whether a letter B may proceed onto the weighing plate 213 or which type (length, thickness, height) of letter is to be expected.

The input/output interface 104 on the output side is connected with a subsequent franking machine via a bidirectional data line for exchange of signals Sf. These can, for example, be signals that concern letter-specific data.

The transport and weighing part 2 is basically composed of a transport device 21 and a measurement transducer 22. The transport device 21 is in turn composed of a transport belt 212, a motor 211 for driving the transport belt 212 as well as a mechanical receptacle 214. The part of the transport belt 212 on which the letter B stands forms the weighing plate 213.

The basic component of the measurement transducer 22 is a piezoelectric weighing cell that is mechanically connected with the transport device 21 via the receptacle 214 and electrically connected with the computer 10 via a bidirectional data line, as well as with the motor 211 via a control line.

The input sensor 11 disposed in the input region of the weighing plate 213. The output sensor 12 is disposed in the output region of the weighing plate 213.

If and when the leading edge of a letter B arriving from the sorting device passes the input sensor 11, a first signal proceeds from this input sensor 11 to the input counter 105. When the trailing edge of the letter B passes the input sensor 11, a second signal proceeds to the input counter 105 and is stored therein as an incoming counter value Ne. The weighing process is initiated from the input counter 105 to the measurement converter 22 via the microprocessor 100, the program memory 101 as well as the non-volatile storage 102 and subsequently via the data line, and after the conclusion of the same weighing process the result is stored in the memory 102 related to its address.

The measurement data are buffered in the working memory 107. Receipt readiness for the next letter B is subsequently communicated to the sorting device via the input-side input/output interface 103.

When the leading edge of the letter B passes the output sensor 12 in traveling downstream toward the franking machine, a first signal proceeds from this output sensor 12 to the output counter 106. When the trailing edge of the letter B passes the output sensor 12 with its trailing edge, a second signal travels to the output counter 106 and is stored therein as an outgoing counter value Na. At least the weight G of the letter B to be expected is communicated from the output counter 106 to the franking machine via the microprocessor 100, the program memory 101 and the non-volatile memory 102 and subsequently via the data line.

A first pause time period Tp1 begins with the entry of the letter B onto the weighing plate 213, or with the leading edge of the letter B passing the input sensor 11.

The first pause time period Tp1 ends and the measurement time Tm begins upon the trailing edge of the letter B passing the input sensor 11 (the letter B is completely on the weighing plate 213). The inflow of a letter B is detected in the input counter 105 and signaled to the microprocessor 100.

A second pause time period Tp2 begins after the end of the measurement time period Tm (meaning a stable weight value G exists and is stored in the non-volatile memory 102) and leading edge of the letter B passes the output sensor 12.

The second pause time period Tp2 is ended when the trailing edge of the letter B passes the output sensor 12 (the letter B has exited the weighing plate 213). The residence (dwell) time period Tw of the letter B on the weighing plate 213 thus ends at the same time. The residence time Tw consequently composed of the sum of the first pause time period Tp1, the measurement time Tm and the second pause time period Tp2 (see also the subsequent figures). The outflow of the letter B is detected in the output counter 106 and signaled to the microprocessor 100.

The spatial progression for the weighing of a long letter B1 is shown in FIG. 2a1 and the associated time diagram is shown in FIG. 2a2. Phase I corresponds to the arrival (inflow) event, identical to the first pause time period Tp1. Phase II corresponds to the measurement event, that lasts until a stable weight value is achieved. The actual measurement time Tm1 is longer. The stable weight has "settled" to a value G1 that is used as the weight of the long letter B1. Phase III immediately follows phase 11, and consequently lasts longer than the pause time period Tp2 that corresponds to the outflow event.

The letter B1 has completely exited the weighing plate 213 with the beginning of phase IV.

The workflow when a short letter B2 follows a long letter B1 is shown in FIGS. 2b1 and 2b2. As already described in the preceding, in phase 11 the stable weight value G1 exists for the long letter B1. After the end of the measurement time period Tm1 for the letter B1, the short letter B2 can proceed onto the weighing plate 213. As soon as the letter 2 is conveyed onto the weighing plate 213, the input sensor 11 is activated.

Phase III begins at the same time as the first pause time period Tp3 for the letter B2. The weight curve temporarily rises and then drops again until a new stable weight value G2 occurs that corresponds to the weight of the letter B2. This is due to the fact that the total weight initially rises by the incrementing weight contribution of the arriving short letter B2 and then continuously decreases by the decrementing weight contribution of the departing long letter B1 until only the short letter B2 is still on the weighing plate 213. The long letter B1 begins to leave the weighing plate 213 and activates the output sensor 12 when the input sensor 11 is still activated by the short letter B2. Phase III is ended when the trailing edge of the letter B1 passes the output sensor 12.

Phase IV begins with the measurement time period Tm2 for the letter B2. Phase IV ends with the elapse of the second pause time period Tp4 for the letter B2. Corresponding to the length and weight ratios, the pause times Tp3 and Tp4 for the short letter B2 are shorter than the pause time periods Tp1 and Tp2 for the long letter B1.

Phase V begins when the trailing edge of the letter B2 passes the output sensor 12 and has therewith left the weighing plate 213. Input sensor 11 and output sensor 12 are free (un-activated) and the weight value is zero.

The workflow when a short letter B2 follows a short letter B1 is shown in FIGS. 2c1 and 2c2.

Phase I: In contrast to the previously-described case, the first pause time period Tp1 is shorter since the short and light letter B1 completely lies on the weighing plate 213 in a shorter time period than a longer and heavier letter.

Phase II: The required measurement time period that ends with conclusion of the phase 11 is also correspondingly shortened. The weight value G1 for letter B1 exists with sufficient stability. The actual measurement time period Tm1, however, runs until the leading edge of letter B1 passes the output sensor 12.

Phase III: The subsequent short letter B2 arrives on the weighing plate 213 in the pause time period Tp3, whereby the weight value rises. The pause time period Tp3 is ended when the trailing edge of the letter B2 passes the input sensor 11. Phase III is concluded with this occurrence.

Phase IV: The measurement time Tm2 for letter B2 begins. The letter B1 is still completely on the weighing plate 213. The total weight Gs=G1+G2 is determined together for both letters B1 and B2. As an alternative, in this phase the possibility already exists for weight determination for the letter B2 from the difference G2=Gs−G1. Phase IV ends with the conclusion of the measurement time period Tm1 for letter B1, meaning when its leading edge passes the output sensor 12.

Phase V: The letter B1 exits the weighing plate 213. The second pause time Tp2 begins for the letter B1. Phase V ends with the end of the pause time period Tp2; the trailing edge of the letter B1 passes the output sensor 12.

Phase VI: The second letter B2 is alone on the weighing plate 213; the determined weight value corresponds to the weight value G2 of the letter B2. A conclusion about the measurement precision is possible by comparison of the weight value G2 determined in phase VI with the weight value G2 determined via difference formation in phase IV. If necessary, suitable correction factors can be derived from this.

After the elapse of the associated measurement time Tm2, the letter B2 then begins to leave the weighing plate 213; this means that its leading edge passes the output sensor 12. The second pause time period Tp4 for the letter B2 begins with this occurrence. Phase VI ends together with the phase time period Tp4.

Phase VII: Begins with the trailing edge of the letter B2 passing the output sensor 12.

In FIGS. 2d1 and 2d2 the workflow is shown when three short letters B1, B2, B3 arrive on the weighing plate 213 in succession and are simultaneously present for a short time on the same weighing plate 213. The maximum number of the letters on the transport belt 212 would here be M=3.

Up to the end of phase IV, the workflow in FIGS. 2d1 and 2d2 is the same as the workflow in FIGS. 2c1 and 2c2. For brevity, the spatial workflow is only shown as of phase V in this case and the description of the temporal workflow ensues analogously.

Phase V: At the beginning the third short letter B3 arrives on the weighing plate 213 and its first pause time period Tp5 begins. Phase V ends together with the pause time period Tp5 when the trailing edge of letter B3 passes the input sensor 11.

Phase VI: The letter B3 is located on the weighing plate 213 together with both of the preceding letters B2 and B1. The measurement time Tm3 proceeds for the letter B3. The total weight Gs=G1+G2+G3 is determined with the presence of the stable weight state. The phase VI ends together with the measurement time period Tm1 for the letter B1.

Phase VII: The leading edge of letter B1 passes the output sensor 12 and the second pause time period Tp2 runs until the trailing edge passes the output sensor 12. The residence time Tw1 for the letter B1 is ended.

Phase VIII: The letter B1 has left the weighing plate 213. A stable weight state exists with the total weight Gs=G2+G3. The measurement time periods Tm2 and Tm3 for the letters B2 and B3 are still running. The phase VIII ends together with the measurement time period Tm2 for the letter B2.

Phase IX: The leading edge of the letter B2 passes the output sensor 12 and the second pause time period Tp4 runs until the trailing edge passes the output sensor 12. The residence time Tw2 for the letter B2 is ended.

Phase X: The letter B2 has left the weighing plate 213. The letter B3 is alone on the weighing plate 213; a stable weight state exists with the weight value G3.

Phase XI: The leading edge of letter B3 passes the output sensor 12 and the second pause time period Tp6 runs until the trailing edge passes the output sensor 12. The residence time Tw3 for the letter B3 is ended.

Phase XII: The letter B3 has left the weighing plate 213. The current weight value is G=0.

The workflow when a light, long letter B2 follows a short, heavier letter B1 is shown in FIGS. 2e1 and 2e2.

Up to the end of phase 11, identity exists with the workflow in FIGS. 2a1 and 2a2. The workflow for FIGS. 2e1 and 2e2 is therefore only described as of phase III.

Phase III: At the beginning, the second letter B2 arrives on the weighing plate 213 and its first pause time period Tp3 begins. While the second letter B2 enters onto the weighing plate 213, the first letter B1 already begins to exit. Before the trailing edge of the second letter B2 has passed the input sensor 11, the leading edge of the first letter B1 has passed the output sensor 12. The weight curve in FIG. 2e2 therefore initially rises over the first pause time period Tp3 of the letter B2 and then falls over the second pause time period Tp2 of the letter B1. The measurement time Tm1 for the first letter B1 is ended and the pause time period Tp2 begins when its leading edge passes the output sensor 12. The measurement time period Tm2 for the letter B2 simultaneously begins. Phase III is ended when the trailing edge of the letter B1 passes the output sensor 12. The residence time Tw1 of the letter B1 on the weighing plate 213 has elapsed.

Phase IV: The second letter B2 is alone on the weighing plate 213; a stable weight state exists with the weight G2.

Phase V: The leading edge of the letter B2 passes the output sensor 12; the measurement time period Tm2 is ended and the second pause time period Tp4 begins. When the trailing edge of the letter B2 passes the output sensor 12, the pause time period Tp4 and simultaneously the phase V end.

Phase VI: The letter B2 has left the weighing plate 213; the weight value is G=0.

The workflow when a light, long letter B2 follows a heavier, long letter B1 is shown in FIGS. 2f1 and 2f2. Correspondence essentially exists with the workflow in FIGS. 2e1 and 2e2; only the residence time for the first letter B1 is longer.

Figure 3:
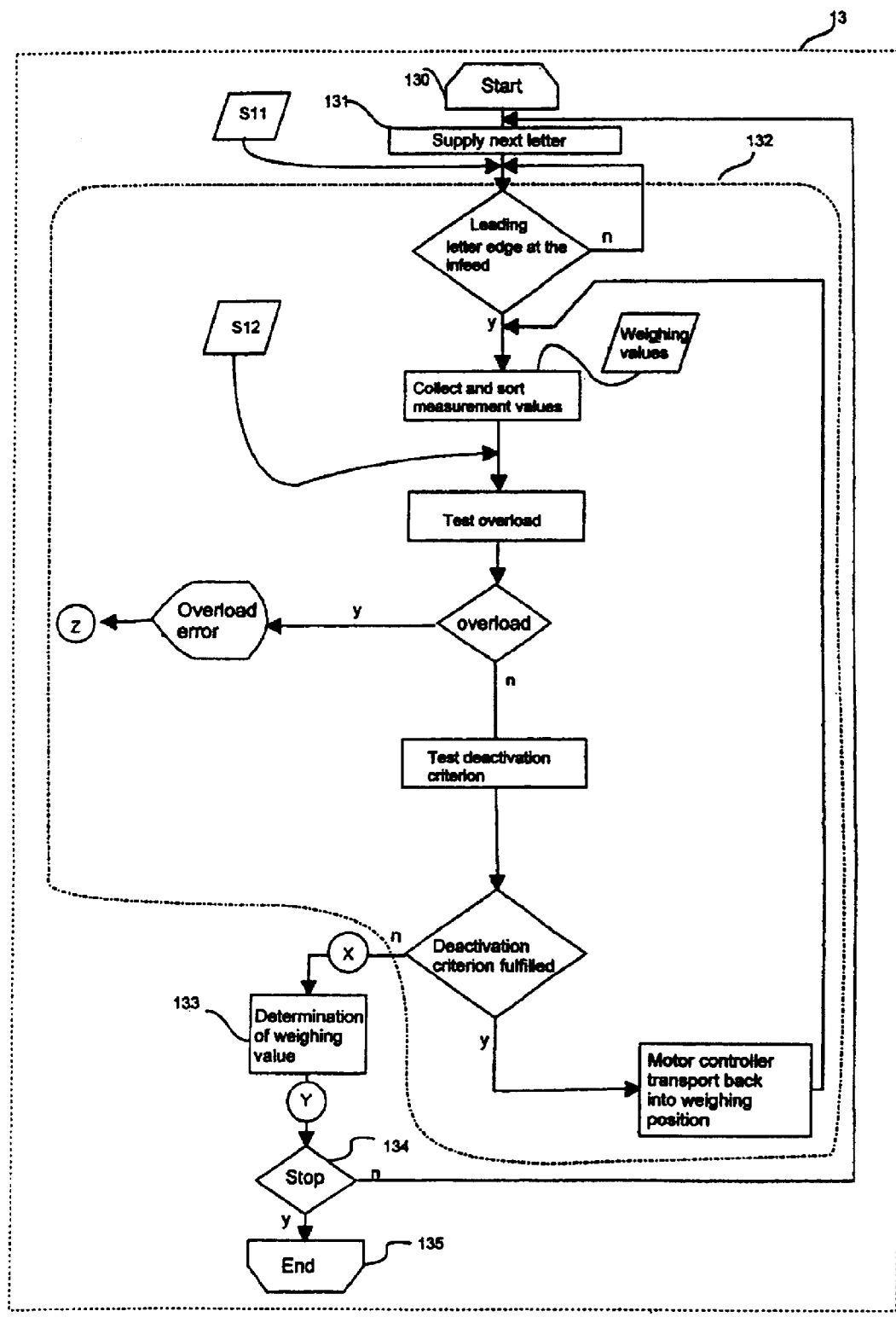
FIG. 3 is a flowchart for the overall controller of the inventive scale.

The flowchart for the entire control of the scale corresponding to the prior art according to EP 1 014 052 A1 (in particular FIG. 6 thereof) is shown in FIG. 3. Only a basic description follows.

In step 130, the workflow controller for the control part 13 is started. The letter input is detected with the input sensor 11 as a signal S11 according to the order of the first letter B1, second letter B2 and so on. The next letter is supplied with the step 131.

Step 132 contains a number of partial steps concerning the measurement value preparation, including sorting, testing of the deactivation criteria given too-strong measurement value fluctuations and overload testing.

Figure 4:
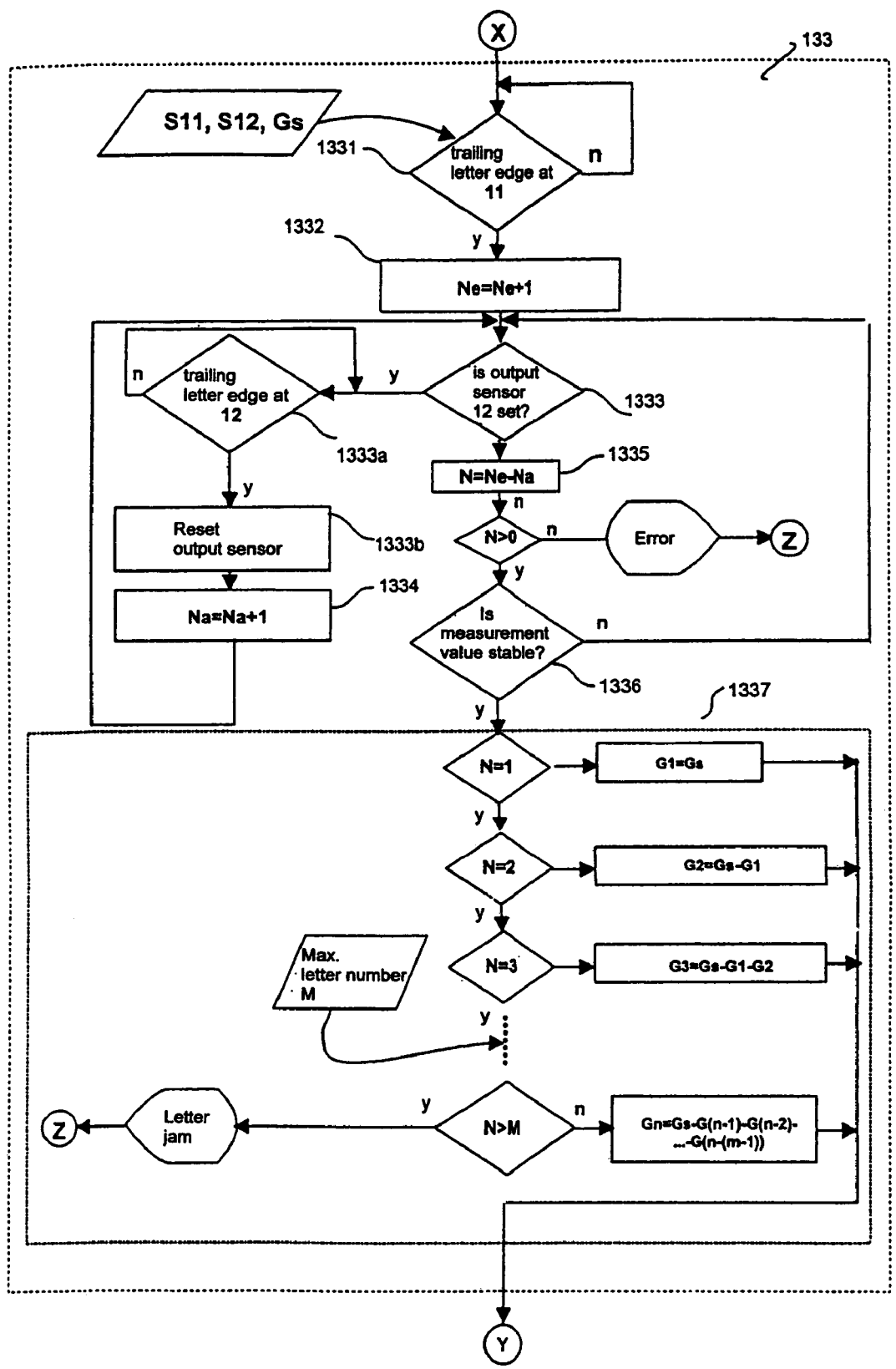
FIG. 4 Is a flowchart diagram for the controller of the weighing value determination in accordance with the invention.

Step 133 includes the weighing value determination in accordance with the invention with a number of partial steps (for this see FIG. 4 together with explanation).

Step 134 concerns the stop decision. If "last letter no", then further according to step 131; if "last letter yes", then further according to step 135, the process ends.

The flowchart for the inventive weighing value determination is shown in FIG. 4 when a number of letters B are simultaneously present on the weighing plate 213. The input X of the weighing value determination part 133 is connected with the output of the transport controller and overload monitoring 132 (see FIG. 3).

Step 1331 contains the input monitoring via the input sensor 11. If a letter B passes the input sensor 11, a signal S11 is supplied to the input counter 105 and is detected in this as an increasing counter value Ne or, respectively, Ne+1. The number Ne of the incoming letters is determined by the input counter 105 via the counting of the leading letter edges.

The measurement time period Tm when the input sensor 11 is free again (meaning when the trailing edge of the incoming letter B has passed this input sensor 11) begins with step 1332. As soon as a stable total weight value Gs exists, the next letter is supplied insofar as it exists.

Step 1333 contains the output monitoring via the output sensor 12. If a letter B passes the output sensor 12, a signal S12 is supplied to the output counter 106 and in this is detected as an outgoing counter value Na or Na+1. As long as the output sensor 12 is not free, a weight variation occurs and therefore no new letter B can be supplied as well.

For this purpose, the current state of the output sensor 12 is stored. A trailing letter edge monitoring ensues in step 1333a and the state of the output sensor 12 is set as a flag. The flag is reset in step 1333b (output sensor 12 is free again).

According to step 1334, the number Na of the outgoing letters B is detected by the output counter 106 via the counting of the trailing letter edges, i.e., when the output sensor 12 is free.

In step 1335 difference monitoring occurs. Here the number N of the letters B located on the weighing plate 213 is determined in the microprocessor 100 from the difference of the number Ne of the incoming letters B and the number Na of the outgoing letters B. Given a difference value N greater than zero, "no" is signaled as an error at the output Z in spite of present letters B.

Step 1336 involves the measurement value stability test. A stable measurement value can exist when both the input sensor 11 and the output sensor 12 are free. Additionally, a further mandatory criterion is when, in an established weight class, the measured weight value remains within an allowed fluctuation range for an established time period of at least one half period but less than measurement time period Tm (for this see also EP 1 014 052, in particular FIGS. 8 and 9 as well as associated text). Although, given a number of letters Bn simultaneously on the weighing plate 213, the total weight Gs can lie in a higher weight class with a larger fluctuation range, a restriction of the fluctuation range by averaging is possible and therewith a sufficient measurement precision can be set.

Step 1337 concerns the actual letter weight determination that provides a step-by-step weight determination corresponding to the incoming and outgoing letters B.

For the first three incoming letters given a previously empty weighing plate 213, the following applies: G=Gs=G1 for N=Ne=1, G2=Gs−G1 for N=Ne=2, G3=Gs−G1−G2 for N=Ne=3.

If the number N of the letters B located on the weighing plate exceeds the allowable maximum number M of the letters B, then N>M is evaluated as a letter jam or, respectively, overload error at the output Z and the scale is run until empty as a start. As a rule M=3 applies.

If the first letter B has exited the weighing plate 213, the difference value is N=Ne−Na=Ne−1 and it applies that: G=Gs−G1−G2 for N=2 and G=Gs−G1−G2−G3 for N=3. In the last case the increasing counter value in the input counter 105 would be Ne=4.

Since a weight determination is possible both given weight increase and given weight decrease, a calibration monitoring with up to three mail pieces can be effected with the inventive method before and after a longer weighing operation.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for weighing items moving over a weighing plate of a dynamic scale in succession comprising the steps of:
   transporting items on a transport belt in succession over a weighing plate having a base formed by the transport belt;
   moving said transport belt at a first, non-zero transport speed during a measurement time range, starting from a beginning of a weighing event of a current item on the weighing plate until a stable weight measurement of a current item occurs, and moving said transport belt at a second speed outside of said measurement time range, said first speed being slower than said second speed; and
   after said stable weight measurement occurs for said current item on the weighing plate, determining a weight of a next-following item on the transport belt, that is momentarily simultaneously present on the weighing plate with said current item, by detecting a weight increase due to inflow of said next following item on said weighing plate and detecting a weight decrease due to outflow of said current item from said weighing plate.

2. A method as claimed in claim 1 wherein each of said items has a leading edge and a trailing edge, and comprising monitoring inflow of said item with an input sensor and emitting an electronic signal to an input counter when the leading edge passes said input sensor.

3. A method as claimed in claim 2 comprising detecting a number of incoming items to said weighing plate with said input counter.

4. A method as claimed in claim 2 comprising beginning measurement of the weight of the current item when the trailing edge of the current item passes said input sensor.

5. A method as claimed in claim 4 comprising operating said transport belt so that said next-following item is present on said weighing plate after said measurement time range for said current item elapses.

6. A method as claimed in claim 3 comprising monitoring outflow of said items from said weighing plate with an output sensor, and emitting an electrical signal from said output sensor to an output counter when the trailing edge of an item passes the output sensor.

7. A method as claimed in claim 6 comprising detecting a number of outgoing items from said weighing plate with said output counter.

8. A method as claimed in clam 7 comprising determining a number of items simultaneously located on said weighing plate by determining a difference of the number of incoming items and the number of outgoing items.

9. A method as claimed in claim 6 comprising determining that said stable weight measurement exists when both said input sensor and said output sensor are free and a weight value of said current item is within a permissible fluctuation range for a predetermined time duration.

10. A method as claimed in claim 9 comprising determining the stable weight value for said current item as a difference of a total weight of all items on said weighing plate minus respective weight values of all other items on said weighing plate.

11. A method as claimed in claim 1 wherein the step of transporting items on said transport belt comprises transporting a plurality of letters, standing on edge, of respectively different dimensions.

* * * * *